United States Patent [19]

McGahee

[11] 4,095,315
[45] Jun. 20, 1978

[54] LOOP RETAINER

[75] Inventor: Welbourne D. McGahee, Melbourne, Fla.

[73] Assignee: Loop-A-Line, Inc., Melbourne, Fla.

[21] Appl. No.: 760,920

[22] Filed: Jan. 21, 1977

[51] Int. Cl.² .................. A44B 13/00; A43C 11/08
[52] U.S. Cl. .................................... 24/231; 403/208;
24/201 HE; 24/230 A
[58] Field of Search ....... 24/201 HE, 230 TC, 230 R,
24/231, 236, 243 R; 43/42.08, 42.09, 42.37,
42.38, 42.49, 43.1, 43.12, 44.83, 44.86; 403/208,
209, 206, 406

[56] References Cited

U.S. PATENT DOCUMENTS

| 794,979 | 7/1905 | Haverly | 24/236 |
| 1,182,471 | 5/1916 | Frost | 43/44.83 |
| 2,242,726 | 5/1941 | Leusch | 43/42.44 |
| 2,263,743 | 11/1941 | Shope | 43/42.08 |
| 2,391,167 | 12/1945 | Kelly | 43/44.92 |
| 3,076,284 | 2/1963 | Adams | 43/43.1 |

FOREIGN PATENT DOCUMENTS

| 2,408,239 | 9/1975 | Germany | 43/44.93 |

Primary Examiner—Louis G. Mancene
Assistant Examiner—Robert P. Swiatek
Attorney, Agent, or Firm—Harold Gell

[57] ABSTRACT

A connector for securing an object having a loop or eyelet affixed thereto is provided by an open loop of rigid, spring wire or similar material which is secured to a body so that one leg of the opened loop enters, and essentially traverses a bore within the body.

41 Claims, 24 Drawing Figures

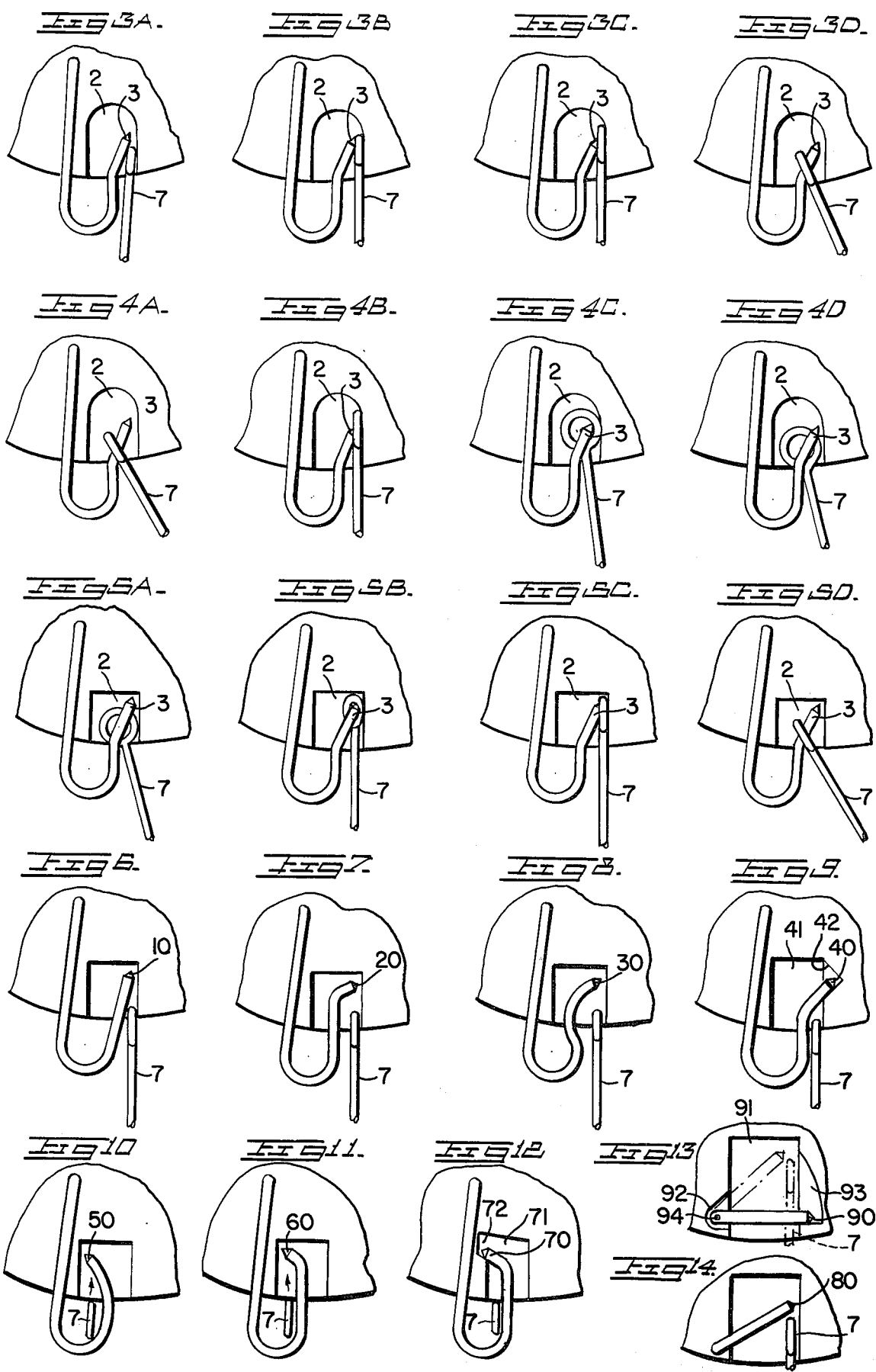

LOOP RETAINER

THE INVENTION

This invention relates to a connector which facilitates the rapid attachment to a body of an object having a loop or eyelet affixed thereto. The apparatus is used in the assembly procedures and apparatus described in the co-pending patent application Ser. No. 760,927 on "Method And Apparatus For Fabricating Fishing Lures Etc." filed by Welbourne D. McGahee. Therefore the invention is disclosed herein as being incorporated in a fishing lure body, but this is by way of example only. The range of applications of the connector is limited only by the infinite variety of bodies in existence now or in the future.

BACKGROUND OF THE INVENTION

Heretofore means to secure objects to bodies have been provided by a vast number of apparatus all of which require extensive manipulation or are subject to the coupling being disconnected.

For instance hooks are attached to fishing lures by passing a "U" shaped strap through the hook eyelet and screwing the strap to the lure body by one or two screws. Alternately hooks may be affixed to fishing lures by crimping a screw eye on the hook eyelet and threading the screw eye into the lure body. Both of these means to secure hooks to lures involve considerable manual manipulation and are subject to failure due to the relatively fine threads of the screws which easily pull loose.

In our complex society an enumerable number of situations occur where an object must be attached to a body. The approaches used are numerous but they all require a substantial amount of manipulation and a relatively complex apparatus if the coupling is to be one which will not easily become undone.

OBJECT OF THE INVENTION

Therefore, it is an object of the present invention to provide a means whereby an object may be coupled to a body by a relatively simple apparatus which may be quickly coupled and decoupled but prevents accidental uncoupling.

A further objective of the invention is to provide a hook retainer for a fishing lure which will allow a hook to be coupled to the lure body without the use of screws or screw eyes.

A further objective of the present invention is to provide a means to attach a leader to a lure body without the necessity of tying knots in the leader material or using snaps or swivels.

A still further objective of the present invention is to provide a means to secure a leader to a lure body which requires no screws, rivets, or screw eyes.

A further objective of the present invention is to provide a universal retaining means for attaching objects having loops or screw eyes affixed thereto to a body.

SUMMARY OF THE INVENTION

The invention disclosed herein is a coupling means based upon the principle of a spring member positioned within a bore in a body so that one end is positioned down the bore and adjacent to one side thereof and the other end is affixed to the opposite side and either near the surface of the body or on the surface of the body. In a preferred embodiment of the invention a bore is provided in the body of a fishing lure and a "U" shaped spring steel wire is fastened to the body so that the bottom of the "U" protrudes from the surface of one leg of the "U" is not secured to the body but is positioned across and within a bore formed in the body. The bore has a diameter slightly larger than the eye of a hook so that the hook may be attached to the lure by inserting the eye into the bore and forcing it past the end of the "U" shaped member. The spring tension of the "U" shaped member allows it to be deflected as the end of the hook eye passes. Twisting the hook causes the hook eye to loop around the end of the "U" so that when the hook is withdrawn the wire "U" shaped member passes through the eye and the hook is secured in the "U" portion on the surface of the lure body.

DESCRIPTION OF THE DRAWINGS

FIGS. 3A through 3D depict the sequence of placing a hook eye on the retainer.

FIGS. 4A through 4D depict the sequence of events required to remove a hook.

FIGS. 5A through 5D depict the sequence of events required to place an eyelet on the retainer when the retainer end is in close proximity to the bore bottom.

FIGS. 6 through 14 illustrate various embodiments of the present invention.

FIG. 15 is a perspective view of an alternate embodiment of the present invention incorporating a metallic cup.

DESCRIPTION OF THE INVENTION

Figure 1:
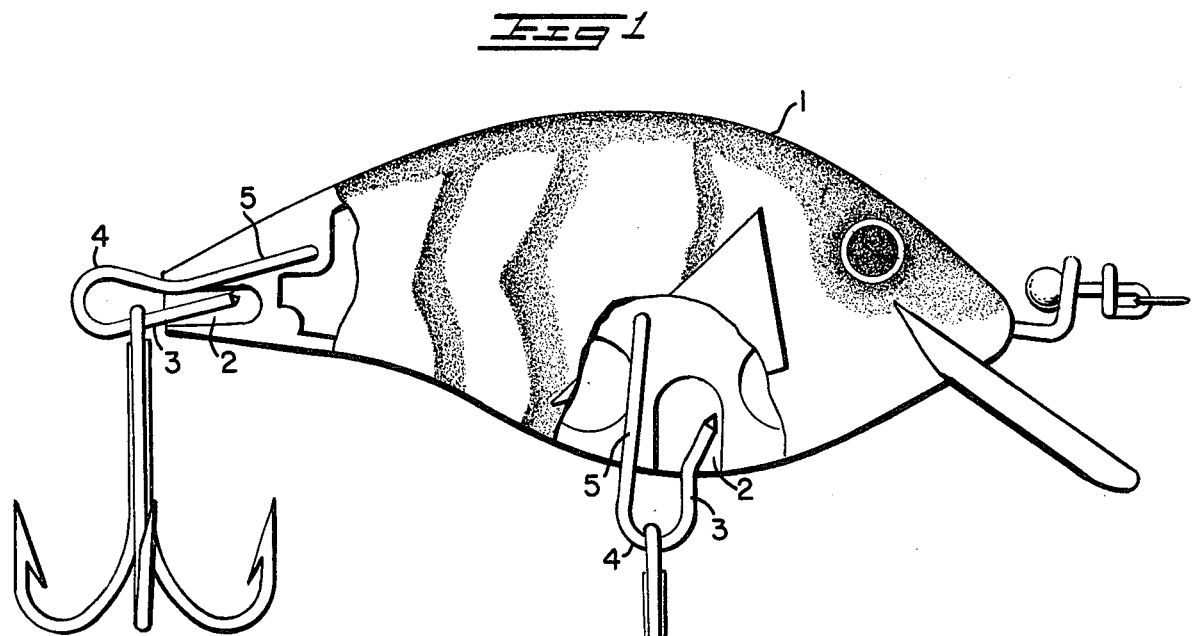
FIG. 1 is a fishing lure incorporating the connectors of the present invention.
Figure 1S:
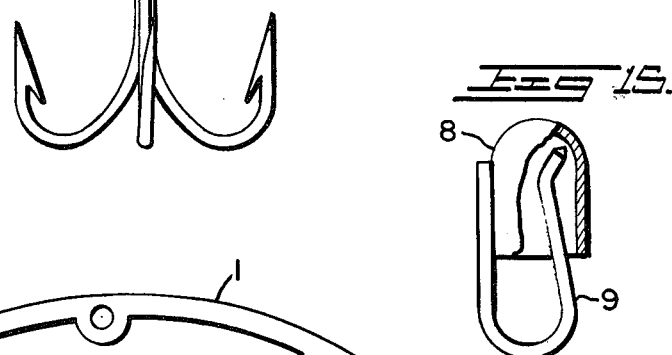

FIG. 1 illustrates a fishing lure incorporating the novel attachment means disclosed in this patent. The lure body 1 is provided with a bore 2 for each attachment means. These bores are generally cup shaped as described later in the specification and are dimensioned to receive the free end 3 of the spring retainer 4. The other end, 5, of the "U" shaped spring retainer means 4 is secured to the body 1 of the lure.

Figure 2:
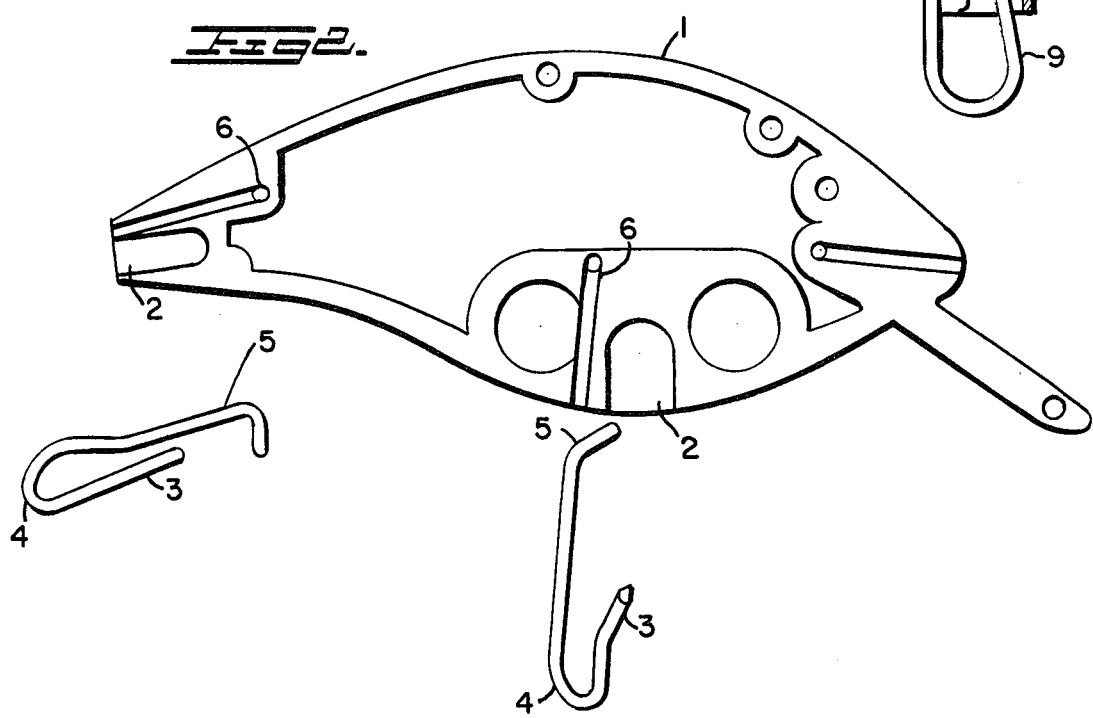
FIG. 2 is a sectional view of a fishing lure illustrating the hook retainer springs and their cooperating grooves and bores.

FIG. 2 presents the spring retainer 4 illustrating the free end 3, and securing end 5. Note that the securing end 5 incorporates a bent portion which is adapted to cooperate with a small hole in the lure body and maintain the spring retainer in a rigid manner. In a preferred embodiment the "U" shaped spring connector 4 is fabricated from spring steel wire but it may be fabricated from flat spring stock or a synthetic filament such as fiberglass, carbon filaments, boron filaments etc.

The cutaway view, FIG. 2, of the lure body 1 illustrates in greater detail the bores 2 and their relationship to the spring retainers 4. Note that the secured leg 5 of the spring retainers cooperate with a formed recess 6 in the body to prevent movement of the leg when the lure is assembled. A hollow lure body is illustrated but it is to be understood that the device may be used with a solid lure body or a one piece lure body.

FIGS. 3A, B, C and D illustrate the steps of connecting a hook eye to a preferred embodiment of the invention. In FIG. 3A the bore or cup 2 has a radius formed in the bottom dimensioned so that as the free end 3 of the spring retainer is forced toward the center of the bore it will not bind on the bottom. Thus when a hook eye 7 is placed between leg 3 and the wall of the bore as illustrated in FIG. 3A and pushed down as illustrated in FIG. 3B the spring 3 is deflected toward the center of the bore as the hook eye 7 approaches the bottom of the bore 2. When the wire forming the hook eye passes the end of spring retainer leg 3 as in FIG. 3C, the spring retainer snaps toward the wall of bore 2 and enters the hook eye. The hook 7 may then be drawn out of the bore 2 as in FIG. 3D with the spring retainer passing through the hook eye securing it to the body 1.

Any attempt to remove the hook from the connector by pushing the hook into the bore 2 and pulling it out will fail to disconnect the hook eye from the connector 4. For instance in FIG. 3C note that when the hook is in the extreme down position the end of retainer leg 3 is still through the eye of the hook and if the hook is depressed even further it is stopped by the bottom of the bore and forced toward the center causing the retainer arm 3 to enter further into the eye.

FIGS. 4A, B, C and D illustrate the steps of removing a hook from the retainer. In FIG. 4A the hook 7 is positioned so that the eye is moved down the free leg 3 of the retainer spring it stops at the position shown in FIG. 4B, which is the same position as when the hook is installed in FIG. 3C. The eye is pressed against the wall of bore 2 and the end of spring retainer leg 3 is in the center of the eye. The hook eye is then twisted 90° as illustrated in FIG. 4C. This causes one side of the hook eye to engage spring retainer arm 3 and create a fulcrum against which the hook eye may be rotated to snap it free from the end of the spring retainer leg 3. The hook eye becomes disengaged from the retainer as illustrated in FIG. 3C because the rotating motion of the hook eye deflects the end of the spring retainer arm 3 away from the wall of the bore 2, allowing the material of the hook eye to pass therebetween. Once the hook eye is free of the retainer it is removed by pulling it straight out of the bore 2 as illustrated in FIG. 4D.

FIGS. 5A, B, C and D illustrate an embodiment where the bore or cup 2 has a flat bottom and the spring retainer is positioned so that inward deflection by the hook eye closes the gap between the bottom of the cup and the end of the retainer leg 3. A hook 7 is inserted in this embodiment by sliding it down the wall of the bore as illustrated in FIG. 5A, twisting the hook past 90° as illustrated in 5B and withdrawing the hook with the spring retainer arm through the eye as illustrated in FIG. 5D. The hook is removed by reversing the installation procedure, that is sliding the hook down the shaft of spring retainer arm 3 until it is in the position illustrated in FIG. 5C and rotating the shaft greater than 90° and withdrawing it along the side of the spring arm 3 as illustrated in FIG. 5A.

FIG. 6 illustrates an alternate embodiment of the instant invention wherein the cup 2 has a flat bottom and the installation and removal procedures illustrated in FIGS. 5A through 5D are used. In this embodiment the free retaining spring leg 10 is relatively straight.

A further alternate of the embodiment illustrated in FIG. 6 may be provided where the cup 2 has a dome configuration as illustrated in FIGS. 3 and 4. In this case the hook is installed and removed as detailed with respect to FIGS. 3 and 4 previously discussed.

A still further embodiment using a spring retainer as illustrated in FIG. 6 may be obtained by configuring the bore 2 so that the flat bottom portion is spaced far enough away from the end of spring retainer leg 10 so that the hook eye may be pressed past the end of the leg.

The led will then snap into the eye as detailed in respect to FIGS. 3A through 3D and a similar installation and removal of a hook may be achieved.

FIG. 7 illustrates an alternate embodiment of the instant invention disclosing a spring retainer having a leg 20 wherein the end portion is bent at an angle of approximataly 45°. This embodiment may use any of the three different cups suggested with respect to FIG. 6 and similar removal and installation procedures must be utilized.

In the embodiment disclosed in FIG. 8, spring retainer leg 30 is in a modified "S" form. This embodiment of the spring retainer loop may be utilized with any of the three different types of bores or cups previously described with appropriate installation and removal procedures.

The embodiment illustrated in FIG. 9 utilizes a cup 41 which has an under cut portion 42 adapted to receive the end of spring retainer leg 40. In this embodiment the hook eye is placed against the wall of the bore so that when it is pushed straight down the spring retainer leg 40 is forced out of the under cut portion 42. As the eye passes the end of spring retainer leg 40, the end of the leg snaps through the hook eye and it may be withdrawn from the bore securely affixed to the body. This embodiment may utilize bottom configurations for the cups similar to those previously described but in the preferred embodiments the cup should be shallow enough so that the hook eye may not be pressed so far within the cup that the end of the spring retainer leg 40 snaps back out again.

The embodiment illustrated in FIG. 10 incorporates a spring retainer configures so that leg 50 curves back toward the secured leg and stops essentially against the wall of the bore adjacent to the secured leg. This embodiment may be adapted to use any of the three different configurations of cups previously discussed. The hook 7 is installed by placing the eye against the wall of the cup between the two legs of the spring retainer and proceeding as previously described.

FIG. 11 illustrates an embodiment of the present invention wherein the spring retainer loop has one end 60 bent at an angle of between 10° and 90° but preferably less than 90° toward the fixed leg. In this embodiment the end of the free leg 60 is positioned against the wall of the cup adjacent to the secured leg and the hook eye is installed by sliding it down the wall of the cup adjacent to the hook leg as illustrated.

FIG. 12 illustrates an embodiment which is similar to the embodiment described with respect to FIG. 11 except the bore 71 includes an under cut portion 72 adapted to receive an elongated, bent portion of the free end of spring retainer leg 70.

FIG. 13 illustrates a further embodiment of the invention which utilizes a single retaining rod. In this embodiment the retaining rod 90 is rigid and the cup 91 is provided with an under cut portion 92 and 93. One end of the rigid rod 90 is secured in the under cut portion 92 by a hinge pin 94. The rod is dimensioned so that the other end will swing within the under cut portion 93 but will be prevented from exiting the surface of the body as illustrated in FIG. 13. In this embodiment a hook is secured by the invention by forcing the hook into the bore so that the rigid arm swings toward the bottom of the bore. The bore must be held in a downward position so that gravity will cause the rigid arm to drop through the hook eye as one edge of the eye passes thereby. The hook is removed in this embodiment by rotating the hook eye 90° when held in the bottom of the bore.

FIG. 14 illustrates an embodiment of the present invention where the spring retainer arm 80 is comprised of a single elongated member. In this embodiment one end of the elongated member is affixed in the body within and near the surface of the bore and the remaining portion of the elongated member 80 enters and crosses the bore as illustrated. This embodiment may use any of the three general cup shape bores previously described and appropriate removal and installation techniques are utilized.

FIG. 15 is an alternate embodiment of the present invention comprised of a metal cup 8 and a retainer 9 welded or soldered to the side thereof. The retainer 9 may be configured as illustrated in FIGS. 3 through 14 and the cup may be dimensioned as previously described for the bore 2.

In adaptations of this embodiment the fixed or secured leg 5 does not require the hooked end portion previously described. However, in the cases where the fixed leg 5 is at an angle to the axis of the cup, the fixed leg end must be bent to provide a segment parallel to the cup wall long enough to permit forming a substantially ridged mechanical bond thereto.

The cup 8 may be fabricated from material other than metal and the retainer 9 secured thereto by bonding, riveting, bolting, etc.

The cup may be secured to a body by a screw, rivet, bolt, etc. passed through a small hole in its bottom. Alternately it may be incorporated in a molded product during the molding process or it may be bonded in a bore or provided with external threads adapted to cooperate with a threaded bore.

Although preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim as a new and useful contribution to the art and for which I desire letters patent is:

1. A connector to be incorporated into a body, comprising:
   a first bore penetrating the surface of said body; a second bore penetrating said body; and an elongated retainer fabricated from a material having spring properties, said retainer including a secured end held rigidly within said body by the side walls of said second bore and a free end positioned adjacent to the wall of said first bore so that said elongated retainer descends into and crosses a majority of the diameter of said first bore.

2. A connector as defined in claim 1, wherein said elongated retainer has a "U" shape configuration including an arcuate center portion.

3. A connector as defined in claim 2, wherein said secured end is positioned to exit the surface of said body adjacent to said first bore so that said arcuate center portion forms a loop above the surface of said body.

4. A connector as defined in claim 3, wherein said secured end and said free end of said retainer are parallel and oriented at an angle to the axis of said first bore.

5. An apparatus as defined in claim 3, wherein said secured end and said free end of said retainer are parallel and oriented parallel to the axis of said first bore further including a bent portion at the end of said free end directed away from said secured end.

6. An apparatus as defined in claim 3, wherein said free end is of serpentine configuration.

7. A connector as defined in claim 3, wherein said free end descends from said arcuate section across the diameter of said first bore so that the end is adjacent to the wall of said first bore closest to said secured end.

8. An apparatus as defined in claim 3, wherein said secured end and said free end of said retainer are parallel and along the axis of said first bore and said free end includes a portion bent toward said secured end and positioned adjacent to the wall of said first bore closest to said secured end.

9. An apparatus as defined in claim 5, wherein said first bore includes an under cut portion and said bent end is elongated and positioned to enter said under cut portion.

10. An apparatus as defined in claim 8, wherein said first bore includes an under cut portion and said bent end is adapted to enter said under cut portion.

11. An apparatus as defined in claim 3, wherein the end of said free end is positioned from the bottom of said first bore a predetermined distance calculated to permit one side of a loop or eyelet to pass thereby.

12. An apparatus as defined in claim 3, wherein said free end is positioned immediately adjacent to the bottom of said first bore to prevent a loop or eye from passing thereby.

13. An apparatus as defined in claim 1, wherein said retainer is fabricated from spring wire.

14. An apparatus as defined in claim 1, wherein said retainer is fabricated from a flat spring leaf.

15. An apparatus as defined in claim 1, wherein said retainer is fabricated from fiberglass filaments.

16. An apparatus as defined in claim 1, wherein said retainer is fabricated from boron filaments.

17. An apparatus as defined in claim 1, wherein said retainer is fabricated from carbon filaments.

18. An apparatus as defined in claim 1, wherein said retainer is fabricated from plastic.

19. A connector, comprising:
   a cup; and
   an elongated retainer fabricated from a material having spring properties, said retainer including a secured end rigidly affixed to the side of said cup and a free end positioned adjacent to the interior wall of said cup so that said elongated retainer descends into and crosses a majority of the diameter of said cup.

20. A connector as defined in claim 19, wherein said elongated retainer has a "U" shape configuration including an arcuate center portion which protrudes above the opening of said cup.

21. A connector as defined in claim 21, wherein said secured end and said free end of said retainer are parallel and oriented at an angle to the axis of said cup.

22. An apparatus as defined in claim 20, wherein said secured end and said free end of said retainer are parallel and oriented parallel to the axis of said cup further including a bent portion at the end of said free end directed away from said secured end.

23. An apparatus as defined in claim 22, wherein said cup includes an under cut portion and said bent end is elongated and positioned to enter said under cut portion.

24. An apparatus as defined in claim 20, wherein said free end is of serpentine configuration.

25. A connector as defined in claim 20, wherein said free end descends from said arcuate section across the diameter of said cup so that the end is adjacent to the wall of said cup closest to said secured end.

26. An apparatus as defined in claim 20, wherein said secured end and said free end of said retainer are parallel and along the axis of said cup and said free end includes a portion bent toward said secured end and positioned adjacent to the wall of said cup closest to said secured end.

27. An apparatus as defined in claim 26, wherein said cup includes an under cut portion and said bent end is adapted to enter said under cut portion.

28. An apparatus as defined in claim 20, wherein the end of said free end is positioned from the bottom of said cup a predetermined distance calculated to permit one side of a loop or eyelet to pass thereby.

29. An apparatus as defined in claim 20, wherein said free end is positioned immediately adjacent to the bottom of said cup to prevent a loop or eye from passing thereby.

30. An apparatus as defined in claim 20, wherein said retainer is fabricated from spring wire.

31. An apparatus as defined in claim 20, wherein said retainer is fabricated from a flat spring leaf.

32. An apparatus as defined in claim 20, wherein said retainer is fabricated from fiberglass filaments.

33. An apparatus as defined in claim 20, wherein said retainer is fabricated from boron filaments.

34. An apparatus as defined in claim 20, wherein said retainer is fabricated from carbon filaments.

35. An apparatus as defined in claim 20, wherein said retainer is fabricated from plastic.

36. An apparatus as defined in claim 19, wherein said cup is fabricated from metal.

37. An apparatus as defined in claim 19, wherein said cup is fabricated from plastic.

38. An apparatus as defined in claim 19, wherein said cup is fabricated from fiberglass.

39. An apparatus as defined in claim 19, wherein said cup is provided with external threads.

40. an apparatus as defined in claim 19, wherein said cup is provided with a hole in its bottom adapted to allow passage therethrough of a securing member.

41. A connector adapted to be incorporated into a body, comprising:
 a bore penetrating the surface of said body;
 an elongated retainer, said retainer including a secured end affixed to said body adjacent to the surface opening of said bore and a free end positioned adjacent to the wall of said bore so that said elongated retainer crosses a majority of the diameter of said bore; and
 said bore including a first undercut section adapted to receive said secured end of said retainer, a hinge pin adapted to secure said secured end of said retainer in said first undercut section and a second undercut section of said bore opposite said first undercut section, said elongated retainer dimensioned to cross the bore in a first position and be retained by the overhang of said second undercut section and swing into said bore in a second position to allow passage of a loop eye thereby.

* * * * *